June 11, 1957  J. E. SUNDERLIN  2,795,707
STATIC PULSE DOUBLING CIRCUIT
Filed June 14, 1954

WITNESSES:
E.G. McCloskey.
T. N. Murray

INVENTOR
Joseph E. Sunderlin.
BY
F. E. Browder
ATTORNEY

United States Patent Office 2,795,707
Patented June 11, 1957

2,795,707

STATIC PULSE DOUBLING CIRCUIT

Joseph E. Sunderlin, Baltimore, Md., assignor to Westinghouse Electric Corporation, East Pittsburgh, Pa., a corporation of Pennsylvania Application June 14, 1954, Serial No. 436,377

12 Claims. (Cl. 307—106)

This invention relates to a device which transforms an alternating-current input voltage into a pulse output having a repetition rate equal to twice the input frequency, and more particularly to a device of the type described wherein the output voltage pulses are of the same polarity.

Prior to this invention, thyratrons were generally used in conjunction with capacitors or pulse-forming networks to produce the sharp output voltage pulses which are needed to drive a magnetron. Thyratrons, however, have a relatively large envelope which makes them bulky and space-consuming. In addition, the thyratron tube is relatively fragile and, therefore, is sensitive to shock and vibration. Because of its fragile and space-consuming structure, the thyratron cannot be used in some installations where space conservation and rugged construction are required.

Accordingly, it is an object of this invention to provide a rugged, all magnetic pulse forming circuit which can be used to drive a magnetron and for other purposes.

An important object of the invention is to provide a magnetic circuit which transforms an alternating-current input into a pulse output having a repetition rate equal to twice the input frequency.

Another object of the invention is to employ, in a pulse-forming network, transformers having "square loop" core material in order that a sharp "cut-off" point will appear between the saturated and unsaturated conditions of the transformers.

A further object of the invention is to provide a pulse-forming circuit having a high Q charging cycle.

A still further object of the invention is to provide a pulse-forming circuit having minimized internal power consumption.

Figure 1:
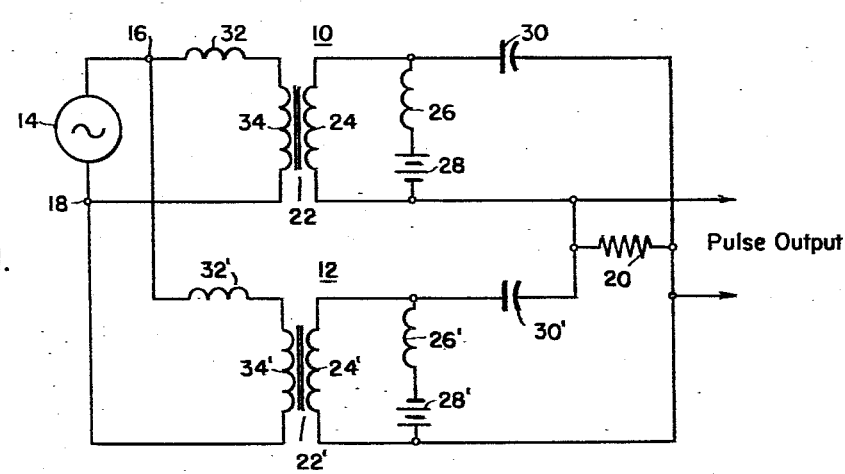
Figure 2:
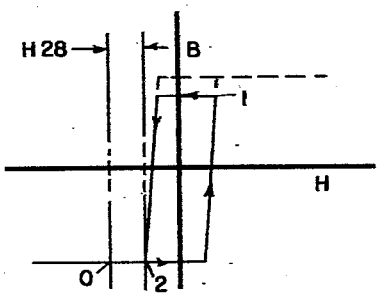
Figure 2:
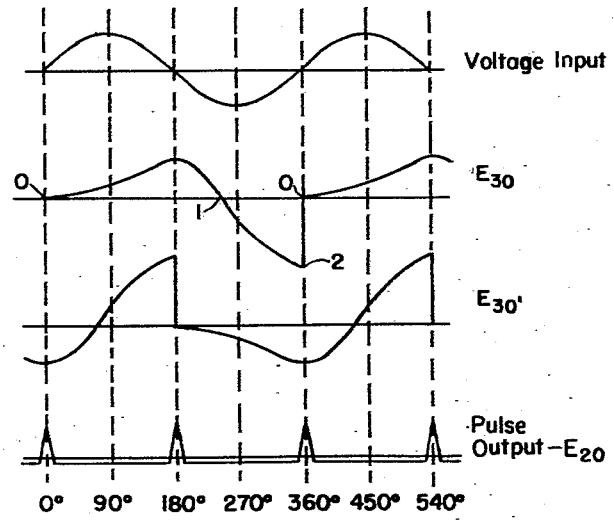

The above and other objects and features of the invention will become apparent from the following description taken in connection with the accompanying drawings which form a part of this specification and in which:

Figure 1 is a circuit diagram of the invention; and
Fig. 2 is a graphical illustration of the operation of the invention.

Referring to Fig. 1, the network shown comprises a pair of pulse-forming circuits 10 and 12. A source of alternating current 14 is connected to the common input terminals 16 and 18 of each circuit; and a common load impedance 20 (in this case a resistance) is connected across the output terminals of the circuits.

Each of the pulse-forming circuits is substantially identical with the other and includes a saturable core transformer 22 which is wound on a core of "square loop" core material. This material is used to produce a more or less rectangular hysteresis loop which will hereinafter be described. Connected in parallel with secondary winding 24 of transformer 22 is an inductance 26 and a source of direct-current voltage 28. Voltage source 28 serves to bias transformer 22 so that it will saturate during only one-half of a charging cycle; and inductance 26 acts as a choke to the alternating currents appearing in the bias circuit. Also included in the secondary of each pulse-forming circuit is the series combination of a capacitor 30 and the load impedance 20. The impedance of load 20 is small compared with the reactance of capacitor 30 in order to have a high Q charging circuit, and also in order that only a very small voltage appears across the load during a charging cycle.

Referring, now, to the primary of the pulse-forming circuit, an inductance 32 is connected in series with primary winding 34. This inductance serves two purposes: (1) it forms an A. C. charging circuit with capacitor 30, and (2) it acts as a low-power-loss impedance which prevents short circuiting of voltage source 14 when transformer 22 saturates.

The corresponding circuit elements of the pulse-forming circuits 10 and 12 have substantially the same impedance values. Several differences, however, should be noted. Bias voltage source 28 in one circuit is reversed in polarity with respect to the corresponding voltage source in the other circuit. Therefore, if the transformer of circuit 10 saturates during the negative half of a charging cycle, it necessarily follows that the transformer of circuit 12 will saturate during the positive half of the cycle. Note also that the capacitors 30 in the respective circuits are connected to opposite sides of load impedance 20.

Operation of the network can best be understood by reference to Fig. 2 showing the hysteresis loop of transformer 22 together with the voltage wave shapes appearing across capacitors 30, 30' and load impedance 20. In the present instance, the characteristics of circuit 10 and the voltage appearing across capacitor 30 will be described first. It can be seen that the hysteresis loop is substantially rectangular in shape because of the "square loop" core material used. Since the quantity H (field intensity) is dependent upon ampere-turns which are, in turn, dependent upon applied voltage, bias voltage source 28 will shift the zero reference point of the loop (i. e., the point representing the beginning of a cycle) to the left by an amount equal to the distance $H_{28}$. Under the conditions just described, voltage source 28 is applying a negative bias. If a positive bias is applied as it is in circuit 12, the zero reference point will be shifted to the right by an amount equal to distance $H_{28}$.

The relationship of H with respect to B (flux density) is shown on the loop at points 0, 1 and 2 in the charging cycle. Corresponding points are shown on wave shape $E_{30}$ which represents the voltage appearing across capacitor 30. Because of the bias voltage 28, transformer 22 in circuit 10 never reaches its positive saturation limit. At point 1 (approximately 230° in the charging cycle) the flux density reverses and builds up in the negative direction. At point 2 (approximately 355° in the charging cycle), the transformer does saturate and allows capacitor 30 to discharge into the load impedance 20. Since the impedance of 20 is small compared wth the reactance of capacitor 30, very little voltage appears across the load 20 except during discharge of the capacitor when a sharp pulse appears. It can be seen, therefor, that circuit 10 will produce a sharp output voltage pulse across load 20 once every 360°.

The operation of circuit 12 is identical with that of circuit 10 except that transformer 22' is biased positively rather than negatively as transformer 22. Therefore, as shown in Fig. 2 (wave shape $E_{30'}$), capacitor 30' will discharge during the positive half of a charging cycle. The output terminals of circuit 12 are connected to the common load 20 so as to have the pulses from each circuit line up with the same polarity as shown in Fig. 2. Thus, it can readily be seen that a series of like-polarity pulses will appear across impedance 20 having a repetition rate equal to twice the frequency of input voltage source 14.

Although this invention has been described in connection with a specific embodiment, it will be understood by those skilled in the art that various changes in form and arrangement of parts can be made to suit requirements without departing from the spirit and scope of the invention.

I claim as my invention:

1. In combination, a load impedance, a source of alternating-current voltage, and a pair of charging circuits connected to said voltage source in parallel relationship for applying a series of like-polarity voltage pulses to said impedance with a repetition rate equal to twice the frequency of said alternating current voltage, each of said circuits comprising a saturable core transformer, primary and secondary windings for said transformer, connections between the primary winding and said voltage source, a first path connecting the ends of the secondary winding and including means for biasing said transformer whereby it can saturate only once during a charging cycle, and a second path connecting the ends of said secondary winding, said second path including said load impedance and a capacitor having a reactance value which is larger than the impedance of said load.

2. In combination, a pair of saturable core transformers, primary and secondary circuits for each of said transformers, a common source of alternating-current voltage included in the primary circuits of said transformers, means included in the secondary circuit of one of said transformers for biasing the same whereby it can saturate only during the positive half of a charging cycle, means included in the secondary circuit of the other of said transformers for biasing the same whereby it can saturate only during the negative half of a charging cycle, a capacitor included in the secondary circuit of each of said transformers, and a common load impedance for said secondary circuits, said load impedance being included in said secondary circuits whereby discharge of said capacitors in response to saturation of their respective transformers will produce a series of like-polarity voltage pulses across said load impedance, said pulses having a repetition rate equal to twice the frequency of said alternating-current source.

3. The combination claimed in claim 2 wherein the reactance of the capacitor in each secondary circuit is greater than the impedance of said load.

4. In combination, a pair of saturable core transformers, primary and secondary circuits for each of said transformers, a common source of alternating-current voltage included in the primary circuits of said transformers, means included in each of said primary circuits for providing an impedance for said voltage source upon saturation of said transformers, means included in the secondary circuit of one of said transformers for biasing the same whereby it can saturate only during the positive half of a charging cycle, means included in th secondary circuit of the other of said transformers for biasing the same whereby it can saturate only during the negative half of a charging cycle, a capacitor included in the secondary circuit of each of said transformers, and a common load impedance for said secondary circuits, said local impedance being included in said secondary circuits whereby discharge of said capacitors in response to saturation of their respective transformers will provide a series of voltage pulses across said load impedance.

5. In combination, a pair of saturable core transformers, primary and secondary circuits for each of said transformers, a common source of alternating-current voltage included in the primary circuits of said transformers, means included in the secondary circuits of each of said transformers for biasing the same whereby they can saturate only once during a charging cycle, a capacitor included in the secondary circuit of each transformer, and a common load impedance included in the secondary circuits of said transformers such that a series of voltage pulses will appear across the load impedance upon discharge of said capacitors, said discharge occurring in response to saturation of said transformers.

6. The combination claimed in claim 5 wherein the voltage pulses appearing across the load impedance have a repetition rate equal to twice the frequency of said alternating current voltage.

7. The combination claimed in claim 5 wherein a current limiting device is included in the primary circuit of each of said transformers for providing a load impedance for said voltage source upon saturation of the transformers.

8. In combination, a load impedance, a source of alternating-current voltage, and a pair of charging circuits connected to said voltage source in parallel relationship for applying a series of like-polarity voltage pulses to said impedance with a repetition rate equal to twice the frequency of said alternating current voltage, each of said circuits including means for storing electrical energy during part of a charging cycle, and magnetic means in each of said circuits for permitting the stored electrical energy to discharge through said impedance during the remainder of a charging cycle.

9. In combination, a load impedance, a source of alternating-current voltage, and a pair of parallel charging circuits connected to said voltage source for applying a series of voltage pulses to said impedance, each of said circuits including means for storing electrical energy during part of a charging cycle, and means in each of said circuits for permitting the stored electrical energy to discharge through said impedance during the remainder of a charging cycle.

10. In combination, a saturable core transformer, primary and secondary windings for said transformer, a source of alternating-current voltage connected to said primary winding, a first electron path connecting the ends of said secondary winding, means in said path for biasing the transformer whereby it will saturate only once during a charging cycle, and a second electron path connecting the ends of said secondary winding, said second path including a capacitor and a load resistor in series, said resistor having an impedance value which is lower than the reactance value of said capacitor.

11. The combination claimed in accordance with claim 10 and including an inductance connected in series with said primary winding, said inductance forming an A. C. resonant charging circuit with said capacitor.

12. In combination, a saturable core transformer, primary and secondary circuits for said transformer, a source of alternating-current voltage included in said primary circuit, means included in said secondary circuit for biasing said transformer whereby it will saturate only once during a charging cycle, a load impedance in said secondary circuit, and means connected in series with said load impedance for storing electrical energy during the period of said charging cycle when the transformer is unsaturated, said storing means being such that it will discharge its stored electrical energy during saturation of said transformer to thereby produce a voltage pulse across said load impedance.

References Cited in the file of this patent

UNITED STATES PATENTS 2,292,514    Garlick _____ Aug. 11, 1942
2,338,079    Huge _____ Dec. 28, 1943